US012540086B2

(12) United States Patent
Messenger

(10) Patent No.: US 12,540,086 B2
(45) Date of Patent: Feb. 3, 2026

(54) BICARBONATE REMOVAL FROM MONOETHYLENE GLYCOL-WATER STREAMS

(71) Applicant: CAMERON INTERNATIONAL CORPORATION, Houston, TX (US)

(72) Inventor: Brian Edward Messenger, Crawley (GB)

(73) Assignee: Cameron International Corporation, Houston, TX (US)

(*) Notice: Subject to any disclaimer, the term of this patent is extended or adjusted under 35 U.S.C. 154(b) by 0 days.

(21) Appl. No.: 19/111,325

(22) PCT Filed: Oct. 24, 2023

(86) PCT No.: PCT/US2023/035750
§ 371 (c)(1),
(2) Date: Mar. 13, 2025

(87) PCT Pub. No.: WO2024/091469
PCT Pub. Date: May 2, 2024

(65) Prior Publication Data
US 2025/0256995 A1    Aug. 14, 2025

Related U.S. Application Data

(60) Provisional application No. 63/380,638, filed on Oct. 24, 2022.

(51) Int. Cl.
*C02F 1/52* (2023.01)
*C02F 101/10* (2006.01)

(52) U.S. Cl.
CPC ........ *C02F 1/5245* (2013.01); *C02F 2101/10* (2013.01)

(58) Field of Classification Search
None
See application file for complete search history.

(56) References Cited

U.S. PATENT DOCUMENTS

| | | | |
|---|---|---|---|
| 10,683,219 B2 | 6/2020 | Messenger | |
| 2005/0072663 A1 | 4/2005 | Laborie et al. | |
| 2015/0284272 A1 | 10/2015 | Messenger | |
| 2020/0078702 A1 | 3/2020 | Seo et al. | |
| 2022/0288557 A1* | 9/2022 | Martin | C01F 11/24 |

FOREIGN PATENT DOCUMENTS

| | | |
|---|---|---|
| CN | 106365360 A | 2/2017 |
| WO | 2022155584 A1 | 7/2022 |

OTHER PUBLICATIONS

International Search Report and Written Opinion of International Patent Application No. PCT/US2023/035750 dated on Feb. 20, 2024, 08 pages.
Serpa, F. S. et al., 'An Experimental Study Of Calcium Carbonate Precipitation With Hydrate Inhibitor In MEG Recovery Unit', Upstream Oil and Gas Technology, Feb. 2022, pp. 1-9, 8(100061), Elsevier, Science Direct.

* cited by examiner

*Primary Examiner* — Peter Keyworth
(74) *Attorney, Agent, or Firm* — Jeffrey D. Frantz

(57) ABSTRACT

Systems and processes for the removal of bicarbonate from MEG-water-salt streams are provided. Such systems and processes remove dissolved bicarbonate from MEG-water-salt streams by addition of divalent cations and hydroxide anions.

6 Claims, 2 Drawing Sheets

BICARBONATE REMOVAL FROM MONOETHYLENE GLYCOL-WATER STREAMS

CROSS-REFERENCE TO RELATED APPLICATIONS

The present application is the National Stage Entry of International Application No. PCT/US2023/035750, filed Oct. 24, 2023, which claims priority benefit of U.S. Provisional Application No. 63/380,638, filed Oct. 24, 2022, the entirety of which is incorporated by reference herein and should be considered part of this specification.

BACKGROUND

Field

The present disclosure generally relates to removal of bicarbonate from monoethylene glycol (MEG)-water streams, and more particularly to removal of bicarbonate from MEG-water streams by addition of divalent cations and hydroxide anions.

Description of the Related Art

In the oil and gas industry, MEG is widely used in wellheads and pipelines as a hydrate suppressor to prevent hydrate formation at pipeline conditions. On offshore gas production facilities, where the exposure to lower temperatures in subsea pipelines is significant, MEG is in prevalent use for hydrate inhibition. The lean (dry) MEG is injected in the subsea gas pipeline at or near the wellhead and mixes readily with the produced water. The inhibition process is straightforward, with the MEG decreasing the hydrate formation temperature below the operating temperature and thus preventing hydrate blockage of the pipeline.

After use, the MEG is recovered by removing the water and the dissolved salts, which are produced from the well along with the gas. The removal of water is conventionally referred to as MEG regeneration, while the removal of the dissolved salts is conventionally known as MEG reclamation. After regeneration and reclamation, the MEG can be re-used in hydrate control.

If the dissolved salts are not removed, they can form scale in pipelines and in processing equipment. The extent of scaling depends on the concentrations of the ions and process conditions such as temperature, pressure, and the concentration of carbon dioxide. As an example, as the MEG-water stream passes through MEG regeneration, the temperature is raised and scale may form from $Na_2SO_4$, $CaCO_3$ from unprecipitated calcium ions, and $Mg(OH)_2$ from unprecipitated magnesium ions. Scaling may reduce the efficiency of flow through the pipelines and cause the failure of downstream treatment processes.

SUMMARY

In systems and processes according to the present disclosure, calcium chloride and sodium hydroxide (as aqueous solutions) are added to a MEG-water-salt stream to precipitate dissolved bicarbonates as insoluble calcium carbonate. The insoluble solids can be removed from the process by solid-liquid separation technologies, yielding a filtrate stream low in bicarbonate/carbonate, which can be further processed in MEG recovery systems with improved operability when compared with the untreated MEG-water-salt stream.

In some configurations, a process includes: routing a monoethylene glycol (MEG) water stream containing bicarbonate to a chemical treatment tank; adding divalent cations; adding hydroxide anions; forming and precipitating calcium carbonate; and discharging the MEG-water stream from the chemical treatment tank.

The divalent cations can be calcium added as calcium chloride CaCl2). The hydroxide anions can be added as sodium hydroxide. The process can further include removing the calcium carbonate using solid-liquid separation technologies and yielding a filtrate stream low in bicarbonate/carbonate. The process can further include further processing the filtrate stream in MEG Recovery systems.

BRIEF DESCRIPTION OF THE FIGURES

Certain embodiments, features, aspects, and advantages of the disclosure will hereafter be described with reference to the accompanying drawings, wherein like reference numerals denote like elements. It should be understood that the accompanying figures illustrate the various implementations described herein and are not meant to limit the scope of various technologies described herein.

DETAILED DESCRIPTION

In the following description, numerous details are set forth to provide an understanding of some embodiments of the present disclosure. It is to be understood that the following disclosure provides many different embodiments, or examples, for implementing different features of various embodiments. Specific examples of components and arrangements are described below to simplify the disclosure. These are, of course, merely examples and are not intended to be limiting. However, it will be understood by those of ordinary skill in the art that the system and/or methodology may be practiced without these details and that numerous variations or modifications from the described embodiments are possible. This description is not to be taken in a limiting sense, but rather made merely for the purpose of describing general principles of the implementations. The scope of the described implementations should be ascertained with reference to the issued claims.

As used herein, the terms "connect", "connection", "connected", "in connection with", and "connecting" are used to mean "in direct connection with" or "in connection with via one or more elements"; and the term "set" is used to mean "one element" or "more than one element". Further, the terms "couple", "coupling", "coupled", "coupled together", and "coupled with" are used to mean "directly coupled together" or "coupled together via one or more elements". As used herein, the terms "up" and "down"; "upper" and "lower"; "top" and "bottom"; and other like terms indicating relative positions to a given point or element are utilized to more clearly describe some elements.

Figure 1:
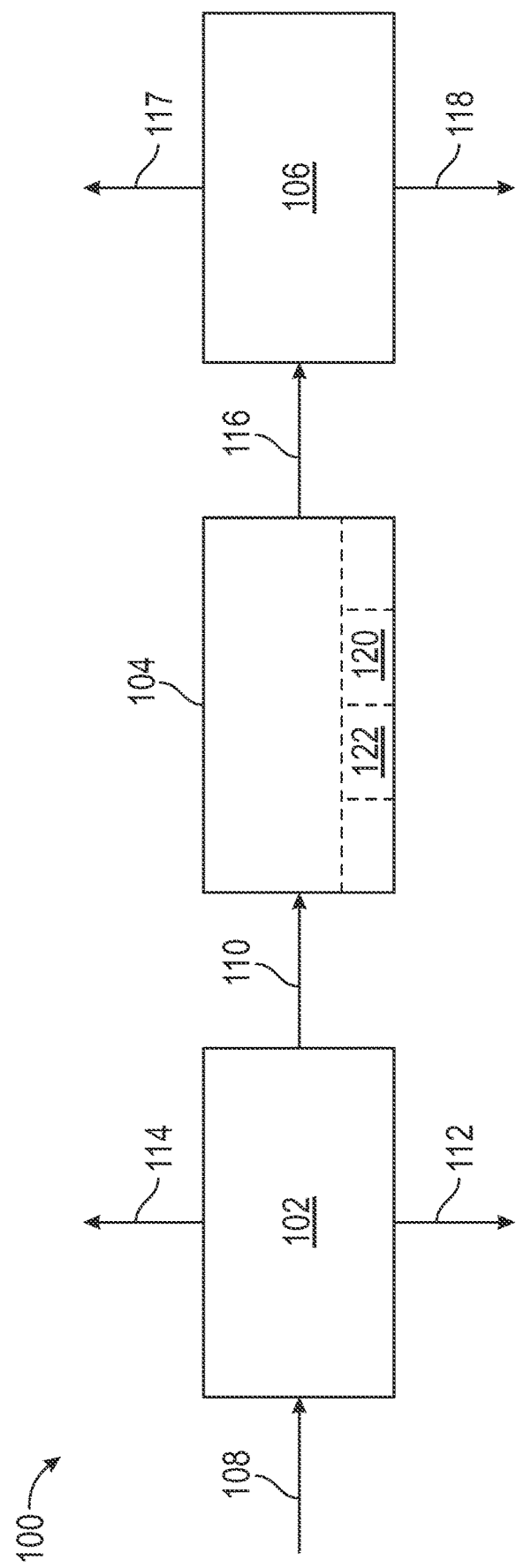
FIG. 1 schematically illustrates an example MEG recovery process.

The present disclosure provides systems and processes for treating MEG-water feed streams so that the MEG can be re-used. The MEG removed from produced streams is processed to remove water, hydrocarbons, and salts before re-use. FIG. 1 schematically illustrates an example MEG recovery process 100. As shown, the recovery process 100 can include hydrocarbon separation 102, vaporization 104, and distillation 106. The hydrocarbon separation step or unit 102 receives a rich MEG stream 108 and may separate three phases. A first liquid phase separates into a first effluent 110, a second liquid phase separates into a second effluent 112, and a gas phase separates into a third effluent 114. The second liquid phase and the gas phase are typically hydrocarbon or hydrocarbon-rich. The first liquid phase predominates in MEG and water, with dissolved and precipitated salts.

Salt removal can be done in two processes—one for salts of divalent cations, and another for salts of monovalent cations. Monovalent salts present in the MEG (e.g., $Na^+$, $K^+$, $Cl^-$, $Br^-$) are removed in the reclaimer section of the MEG recovery process where these species precipitate from the MEG solution as the water and MEG components are removed by vaporization. The monovalent ions precipitate as halide salts NaCl, KCl, NaBr.

In the configuration of FIG. 1, the first effluent 110 can be routed to the vaporization step or unit 104 where MEG and water are vaporized to concentrate the monovalent salts in an unvaporized liquid phase. Vaporized MEG and water can be routed through a crude MEG line 116 to the distillation step or unit 106, where a water stream 117 is removed overhead and a lean MEG stream 118 is withdrawn and routed to storage or reuse. A solids removal unit 120 can receive a stream from the vaporization unit 104 and remove solids, such as precipitated salts, from the stream, which is returned to the vaporization unit 104. A solids removal unit 120 can receive a stream from the vaporization step 104 and remove solids, such as precipitated salts, from the stream, which is returned to the vaporization unit 104.

Typically, MEG feed streams processed in MEG recovery and reclamation units contain dissolved divalent cations ($Mg^{2+}$, $Ca^{2+}$, $Sr^{2+}$, $Fe^{2+}$, $Ba^{2+}$). The dissolved cations are removed from the MEG solution by addition of alkalinity, for example, in the form of hydroxide, bicarbonate, and/or carbonate. The carbonate and/or hydroxides react with the dissolved divalent cations to yield insoluble carbonates and hydroxides such as $CaCO_3$, $Mg(OH)_2$, $Mg(CO_3)$, $FeCO_3$, $Fe(OH)_2$, $SrCO_3$, and $BaCO_3$.

In the configuration of FIG. 1, a divalent treatment unit 122 uses alkalinity, as described above, to precipitate divalent cations as solid salts, thus reducing dissolved divalent cations. The divalent treatment unit 122 may include a solids removal unit to remove the precipitated salt. Thus, the divalent treatment unit 122 can be a divalent removal unit that performs a divalent removal treatment resulting in a stream depleted of divalent cations. Various units, such as units 120, 122, which may be associated with the vaporization step or unit 104, receive a stream of the unvaporized liquid from the vaporization unit or step 104, perform their various treatments, and return the stream to the vaporization unit or step individually, collectively, or in groups. The operations performed by the associated units may be performed in any order, and in series or parallel, with the proviso that precipitated divalent salts will be redissolved if not removed before acidifying. Thus, one of the associated units may receive a stream from another of the associated units, rather than directly from the vaporization.

Bicarbonate is typically present at low levels in formation waters and is therefore not typically an issue for MEG reclamation operations. However, in some cases, bicarbonate is present at elevated levels in the formation water and can accumulate in the reclamation section of the MEG recovery unit with deleterious effects. The thermal degradation reaction for the conversion of bicarbonate to carbonate is shown below:

$$2NaHCO_3 \rightarrow Na_2CO_3 + CO_2 + H_2O \qquad \text{[Reaction 1]}$$

The bicarbonate/carbonate can block pipework and vessels if it is allowed to accumulate uncontrolled.

In systems and processes according to the present disclosure, calcium chloride can be added to remove carbonate. Removal of bicarbonate (which is converted to carbonate during the MEG recovery process) is significantly improved if strong alkali (hydroxide) is added to the bicarbonate-calcium mix.

Figure 2:
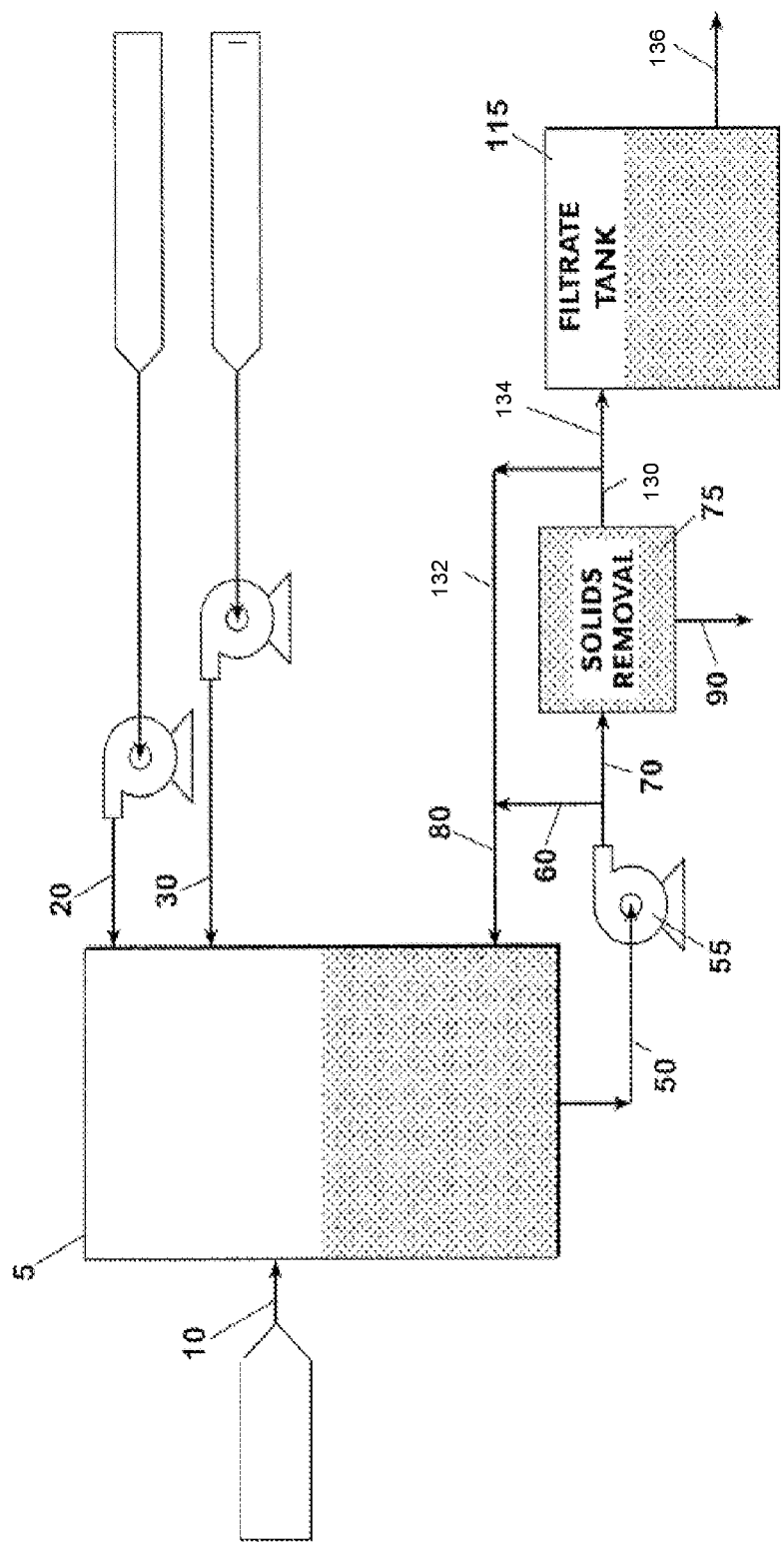
FIG. 2 schematically illustrates an example bicarbonate/carbonate removal unit and process.

FIG. 2 illustrates an example system or treatment unit according to the present disclosure. As shown, the system can include a chemical treatment tank 5 and one or more injection lines. In use, the chemical treatment tank 5 receives an incoming MEG-water stream 10, which may contain various ions. The chemical treatment tank 5 can receive calcium chloride through a calcium chloride injection line 20 and hydroxide through a hydroxide injection line 30. After mixing, the MEG-water stream can be carried away from the chemical treatment tank 5 by an exit line 50.

The MEG-water stream may be pumped by a mixing pump 55 through recycle lines 60, 80 to the chemical treatment tank 5. Alternatively, the MEG-water stream may be pumped through line 70 to a solids removal system 75, where the precipitated solids are removed and sent for disposal 90. Solids removal systems such as filters and centrifuges are well-known in the art, and any suitable system may be used with the invention. The filtrate or centrate from the solids removal system 75 exits the system through line 130. From there, it may be recycled through line 132 to the chemical treatment tank 5 or sent through line 134 to the filtrate tank 115. The MEG-water stream from the filtrate tank 115 is then sent through exit line 136 to downstream equipment for additional treatment. Further details regarding various equipment, components, and/or process steps that can be included in systems according to the present disclosure can be found in U.S. Pat. No. 10,683,219, the entirety of which is hereby incorporated by reference herein.

Like the divalent cation removal unit 122 (where precipitation of dissolved magnesium-calcium-iron-strontium-barium is achieved by addition of hydroxide and/or carbonate), the bicarbonate/carbonate removal unit (where precipitation of dissolved bicarbonate/carbonate is achieved by addition of divalent cations, and optionally hydroxide ions), for example as shown in FIG. 2, can be located at the front end of the MEG recovery unit or on a slipstream of the reclaimer.

Locating the bicarbonate/carbonate removal unit at the slipstream of the reclaimer can be beneficial since the carbonate is allowed to accumulate in the reclaimer. This advantageously allows for the use of smaller precipitation vessels, and the resulting slurry will have higher solids content. In some configurations of the reclaimer slip-stream option, additional hydroxide may not be required since the bicarbonate is converted to carbonate in the reclaimer, as shown in Reaction 1. The resulting carbonate reacts quantitatively with the divalent cation without the need for additional hydroxide, as shown in Reaction 2.

$$Na_2CO_3 + CaCl_2 \rightarrow CaCO_3 + 2NaCl \qquad \text{[Reaction 2]}$$

Locating the bicarbonate removal system at the front-end of the MEG package can be beneficial if bicarbonate is present at high levels. In such cases, hydroxide is required as well as divalent cations to ensure quantitative removal of the bicarbonate and of the divalent cations. Using calcium chloride addition as an example, the desired reaction is shown below:

$$CaCl2 + 2\,NaHCO3 \rightarrow CaCO3 + H2O + CO2 + 2\,NaCl \quad [\text{Reaction 3}]$$

However, the reaction shown above does not proceed to completion. Hydroxide ions are therefore added to ensure quantitative removal of bicarbonate and calcium carbonate by converting the bicarbonate to carbonate, which reacts with bicarbonate to yield carbonate ions. The carbonate ions can then react with calcium chloride as per Reaction [2] above.

$$NaHCO3 + NaOH \rightarrow Na2CO3 + H2O \quad [\text{Reaction 4}]$$

Experimental Results

Simulated results were obtained using OLI Analyzer software—a thermodynamic electrolyte equilibrium model. The starting solution for the simulations is shown below in Table 1. Results of the chemistry simulation study are shown in Table 2. The simulations were carried out at 60° C. and atmospheric pressure.

TABLE 1

Starting Composition for Simulation

|  |  | Water | MEG | NaCl | NaHCO3 |
|---|---|---|---|---|---|
| MASS | kg | 2,000 | 1,500 | 10 | 16.8 |
| MOLES | mol | 111,111 | 24,194 | 171 | 200 | achieve quantitative bicarbonate removal, with 50% of the starting bicarbonate remaining in solution as bicarbonate or carbonate ions. The unconverted bicarbonate would accumulate in the reclaimer, which can lead to operational difficulties, such as blockages of pipework and vessels and blockage/fouling of heat exchangers.

Addition of calcium at a 1:1 ratio with the bicarbonate (CASE 6) leads to marginal increases in bicarbonate and calcium removal efficiencies to 72% and 47%, respectively, when compared to the 1:2 case (CASES 03). However, quantitative removal of the bicarbonate is achieved through addition of hydroxides (as NaOH or KOH) as well as calcium ions (as CaCl2)). This is demonstrated in CASE 07 and 08.

Quantitative removal of bicarbonate and of the added calcium as $CaCO_3$ is achieved when the dosing rates of calcium chloride and sodium hydroxide are such that the molar ratios of bicarbonate to calcium chloride to hydroxide are 1:1:1 (CASE 08).

The chemical relationships, systems, and processes described herein also apply for other divalent cations, for example, Fe2+ when added as FeCl2. The sodium hydroxide could be substituted, for example, with potassium hydroxide or strong bases capable of converting bicarbonate to carbonate. Adding the divalent cations as chlorides MCl2 and adding the hydroxide as NaOH advantageously causes the resulting soluble salt (NaCl) to be the typical salt that MEG reclaimers are designed to remove.

Language of degree used herein, such as the terms "approximately," "about," "generally," and "substantially" as used herein represent a value, amount, or characteristic

TABLE 2

Simulation Summary

|  |  | CASE 01 | CASE 02 | CASE 03 | CASE 04 | CASE 05 | CASE 06 | CASE 07 | CASE 08 |
|---|---|---|---|---|---|---|---|---|---|
| NaHCO3 | Kg | 16.8 | 16.8 | 16.8 | 16.8 | 16.8 | 16.8 | 16.8 | 16.8 |
| CaCl2 | Kg | 0 | 0 | 11.1 | 11.1 | 11.1 | 22.2 | 22.2 | 22.2 |
| NaOH | Kg | 0 | 8 | 0 | 4 | 8 | 0 | 4 | 8 |
| pH | — | 8.21 | 10.83 | 6.24 | 8.20 | 10.69 | 5.85 | 5.99 | 9.30 |
| CO2•VAP | Mol | 0.00 | 0.00 | 41.14 | 0.00 | 0.00 | 50.21 | 0.00 | 0.00 |
| CO2•AQ | Mol | 1.74 | 0.00 | 25.63 | 0.00 | 0.00 | 25.19 | 24.21 | 0.00 |
| HCO3-•AQ | Mol | 190.80 | 22.77 | 29.80 | 95.38 | 15.71 | 13.18 | 16.92 | 0.59 |
| CO3[2-]•AQ | Mol | 2.93 | 176.75 | 0.01 | 1.51 | 83.97 | 0.00 | 0.00 | 0.12 |
| [MEG•CO2][—]•AQ | Mol | 3.30 | 0.39 | 0.51 | 1.64 | 0.27 | 0.22 | 0.28 | 0.01 |
| [MEG•CO2]•AQ | mol | 1.24 | 0.00 | 18.09 | 0.63 | 0.00 | 17.92 | 17.19 | 0.00 |
| NaOH•CO3[2-] | mol | 0.00 | 0.10 | 0.00 | 0.00 | 0.03 | 0.00 | 0.00 | 0.00 |
| CaCO3 (S) | mol | 0.00 | 0.00 | 84.79 | 99.91 | 99.96 | 93.24 | 141.34 | 199.20 |
| HCO/CO3 PPTD AS MCO3 | — | — | — | 42.4% | 50.0% | 50.0% | 46.6% | 70.7% | 99.6% |
| HCO/CO3 REMOVED AS CO2•VAP | — | — | — | 20.6% | 0.0% | 0.0% | 25.1% | 0.0% | 0.0% |
| HCO/CO3 REMOVED (VAP or SOLID) | — | — | — | 63.0% | 50.0% | 50.0% | 71.7% | 70.7% | 99.6% |
| Ca PPTD | — | — | — | 84.8% | 99.9% | 100.0% | 46.6% | 70.7% | 99.6% |

As shown, addition of calcium chloride in a molar ratio with bicarbonate of 1:2 (CaCl2) to NaHCO3) as per Reaction [3] above results in precipitation of just 42% of the bicarbonate as calcium carbonate, with 85% of the calcium ions being precipitated as $CaCO_3$ (CASE 03). Addition of hydroxide to CASE 03 (i.e. CASES 04 and 05) increases the calcium precipitation efficiency to 100% but does not close to the stated value, amount, or characteristic that still performs a desired function or achieves a desired result. For example, the terms "approximately," "about," "generally," and "substantially" may refer to an amount that is within less than 10% of, within less than 5% of, within less than 1% of, within less than 0.1% of, and/or within less than 0.01% of the stated amount.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims. It is also contemplated that various combinations or sub-combinations of the specific features and aspects of the embodiments described may be made and still fall within the scope of the disclosure. It should be understood that various features and aspects of the disclosed embodiments can be combined with, or substituted for, one another in order to form varying modes of the embodiments of the disclosure. Thus, it is intended that the scope of the disclosure herein should not be limited by the particular embodiments described above.

What is claimed is:

1. A process comprising:
   routing a monoethylene glycol water stream containing bicarbonate to a chemical treatment tank;
   adding divalent cations by adding calcium chloride;
   adding hydroxide anions by adding sodium hydroxide;
   forming and precipitating calcium carbonate; and
   discharging the monoethylene glycol water stream from the chemical treatment tank.

2. The process of claim 1, further comprising removing the calcium carbonate using solid-liquid separation technologies and yielding a filtrate stream.

3. The process of claim 2, further comprising processing the filtrate stream in a monoethylene glycol recovery system.

4. The process of claim 1, further comprising:
   recycling a first portion of the discharged monoethylene glycol water stream to the chemical treatment tank; and
   routing a second portion of the discharged monoethylene glycol water stream from the chemical treatment tank to a solids removal system.

5. The process of claim 1, wherein the calcium chloride and the sodium hydroxide are added at a dose such that a ratio of $HCO_3:Ca^{2+}:OH^-$ is 1:1:1 on a molar basis.

6. The process of claim 1, wherein the calcium chloride and the sodium hydroxide are added at a dose rate such that a molar ratio of the bicarbonate to the calcium chloride to the sodium hydroxide comprises 1:1:1.

* * * * *